US006919797B2

(12) United States Patent
Hsieh

(10) Patent No.: US 6,919,797 B2
(45) Date of Patent: Jul. 19, 2005

(54) REMOTE-CONTROLLED LOCK

(76) Inventor: Hui-Hua Hsieh, No. 95-4, Ming Hsiang Street, Chung Ho City, Taipei Hsien (TW)

(*) Notice: Subject to any disclaimer, the term of this patent is extended or adjusted under 35 U.S.C. 154(b) by 159 days.

(21) Appl. No.: 10/400,870

(22) Filed: Mar. 28, 2003

(65) Prior Publication Data

US 2004/0187532 A1 Sep. 30, 2004

(51) Int. Cl.[7] ................................................ B60R 25/10

(52) U.S. Cl. ............................ 340/426.13; 340/539.31; 340/5.7; 70/256; 70/257; 70/278.7; 292/144; 292/201; 318/466

(58) Field of Search ........................ 340/426.13, 539.31, 340/5.7, 5.72, 5.73, 825.72, 574; 292/144, 201; 70/256, 257, 271, 275, 278.7; 318/466

(56) References Cited

U.S. PATENT DOCUMENTS 5,015,930 A * 5/1991 Kikuta et al. ............... 318/466
5,603,537 A * 2/1997 Amano et al. .............. 292/201
5,760,703 A * 6/1998 Becker .................. 340/825.67
5,790,034 A * 8/1998 Khoury ..................... 340/5.64
5,852,944 A * 12/1998 Collard et al. ............. 70/278.7
5,881,584 A * 3/1999 Brunoski et al. .............. 70/68
6,062,612 A * 5/2000 Lin ............................ 292/144
6,244,084 B1 * 6/2001 Warmack ................... 70/278.1
6,265,973 B1 * 7/2001 Brammall et al. ....... 340/568.1
6,739,164 B2 * 5/2004 Warmack ..................... 70/257
2001/0027669 A1 * 10/2001 Warmack ..................... 70/257
2004/0089037 A1 * 5/2004 Chang ......................... 70/257

* cited by examiner

*Primary Examiner*—Benjamin C. Lee

(57) ABSTRACT

A remote-controlled lock includes a bottom base, a transmission motor, a connecting rod, a sleeve, a deadbolt, a spring and a casing. The transmission motor is started to rotate clockwise together with the stop member on its shaft by pressing the unlocking button of a remote controller, letting the stop member disengaged from the stopper of the sleeve. Thus, the sleeve and the deadbolt can be moved inward to unlock the remote-controlled lock. On the contrary, pressing the locking button of the remote controller starts the transmission motor to rotate counterclockwise together with the stop member to let the stop member block the stopper of the sleeve. Thus, the sleeve is restricted in position, unable to be moved inward, and the engage member of the deadbolt is engaged in the engage groove of the engage base of a doorjamb to lock the remote-controlled lock.

2 Claims, 7 Drawing Sheets

REMOTE-CONTROLLED LOCK

BACKGROUND OF THE INVENTION

1. Field of the Invention

This invention relates to a remote-controlled lock, particularly to one composed of a bottom base, a transmission motor, a connecting rod, a sleeve, a deadbolt, a spring and a casing. The unlocking button of a remote controller is pressed to start the transmission motor to rotate clockwise together with the stop member on its shaft to let the stop member disengaged from the stopper of the sleeve and enable the sleeve and the deadbolt to be moved inward to compress the spring, thus finishing unlocking of the remote-controlled lock. On the contrary, the locking button of a remote controller is pressed to start the transmission motor to rotate counterclockwise together with the stop member on its shaft to let the stop member block the stopper of the sleeve. Thus, the sleeve is restricted in position and unable to be moved inward, and the engage member of the deadbolt is engaged in the engage groove of the engage base of a doorjamb to finish locking of the remote-controlled lock.

2. Description of the Prior Art

A conventional door lock, as shown in FIG. 1, includes a housing 10 provided inside with a lock base 11. The lock base 11 is provided at one side with lock rods 110 able to extend out of through holes 100 in the sidewall of the housing 10 and be inserted in an elongate groove 141 in the sidewall of a bolt base 140 on a doorjamb 14. Besides, the lock base 11 has a lock core 111 with a keyhole 112 provided respectively at the inner and the outer side. A pull plate 12 is fitted in the inner side wall of the housing 10, having a fixing plate 120 inserted in the guide rail 101 of the housing 10 and contacting the fixing plate 102 of the housing 10. In addition, the housing 10 is provided inside with a deadbolt 13 having one end inserted through the fixing plate 102 of the housing 10 and secured with the fixing plate 120 of the pull plate 12, with a spring 130 fitted around one end of the deadbolt 13 near the pull plate 12. The deadbolt 13 has the other end fixed with a stopper 131 able to extend out of a through hole 103 in the sidewall of the housing 10 and be inserted in the elongate groove 141 in the sidewall of the bolt base 140 of the doorjamb 14. Thus, a key is inserted in the keyhole 112 of the lock core 111 and turned around to drive the lock rods 110 and the stopper 131 to move inward toward the housing 10 and be disengaged from the elongate groove 141 of the bolt base 140 of the doorjamb 14 to perform unlocking of a door lock.

However, a conventional door lock has its lock rods 110 locked only by a key, therefore it is easy to be unlocked by common unlocking tools, having hardly effect of anti-theft.

SUMMARY OF THE INVENTION

One objective of the invention is to offer a remote-controlled lock controlled to be locked or unlocked by a remote controller, having excellent effect of anti-theft.

Another objective of the invention is to offer a remote-controller lock provided with an auxiliary motor, so that the remote-controlled lock can always function normally even if the transmission motor is out of order.

The remote-controlled lock in the present invention includes a bottom base, a transmission motor, a connecting rod, a sleeve, a deadbolt, a spring and a casing combined together. The bottom base is provided thereon with a motor holder, a holding member formed with an accommodating groove having an insert hole in its sidewall, and a fixing base. The transmission motor is positioned on the motor holder of the bottom base and has a stop member secured on its shaft. The connecting rod is disposed at one side of the fixing base of the bottom base, having two opposite projecting studs provided on the wall. The sleeve to be fitted around the connecting rod has a stopper fixed on the outer wall, two opposite lengthwise slide grooves bored in the wall and a projection formed at the front end. The projection of the sleeve has a lengthwise insert hole formed in the interior and two opposite pin holes bored in the wall and communicating with the insert hole for a pin to be inserted therein. The deadbolt is connected with the projection of the sleeve and positioned in the accommodating groove of the holding member on the bottom base, having two opposite pin holes near one end and an engage member on the outer end. The spring is fitted around the deadbolt, and the casing is assembled on the bottom base.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
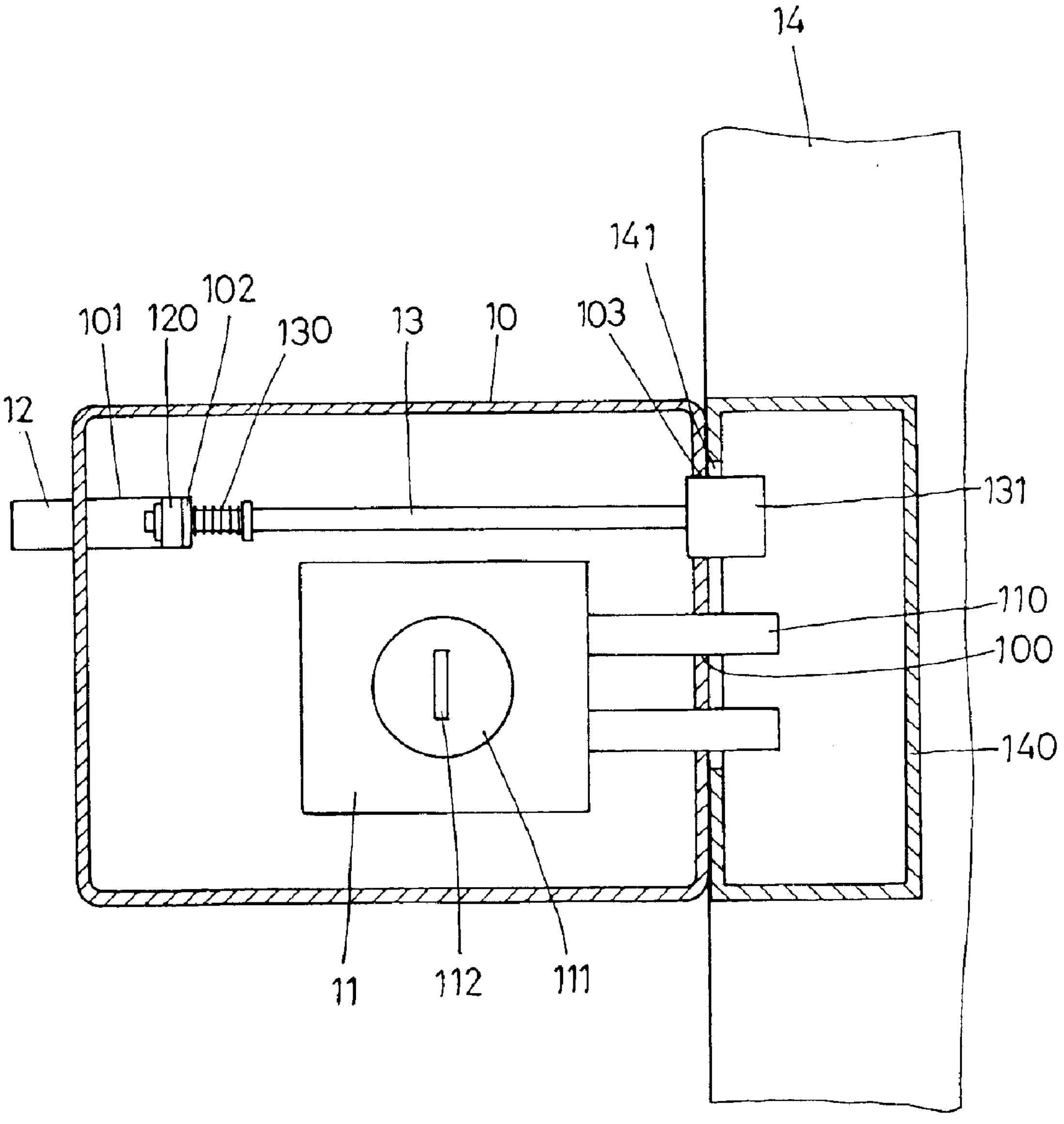
FIG.1 (PRIOR ART)
FIG. 1 is a cross-sectional view of a conventional lock.
Figure 2:
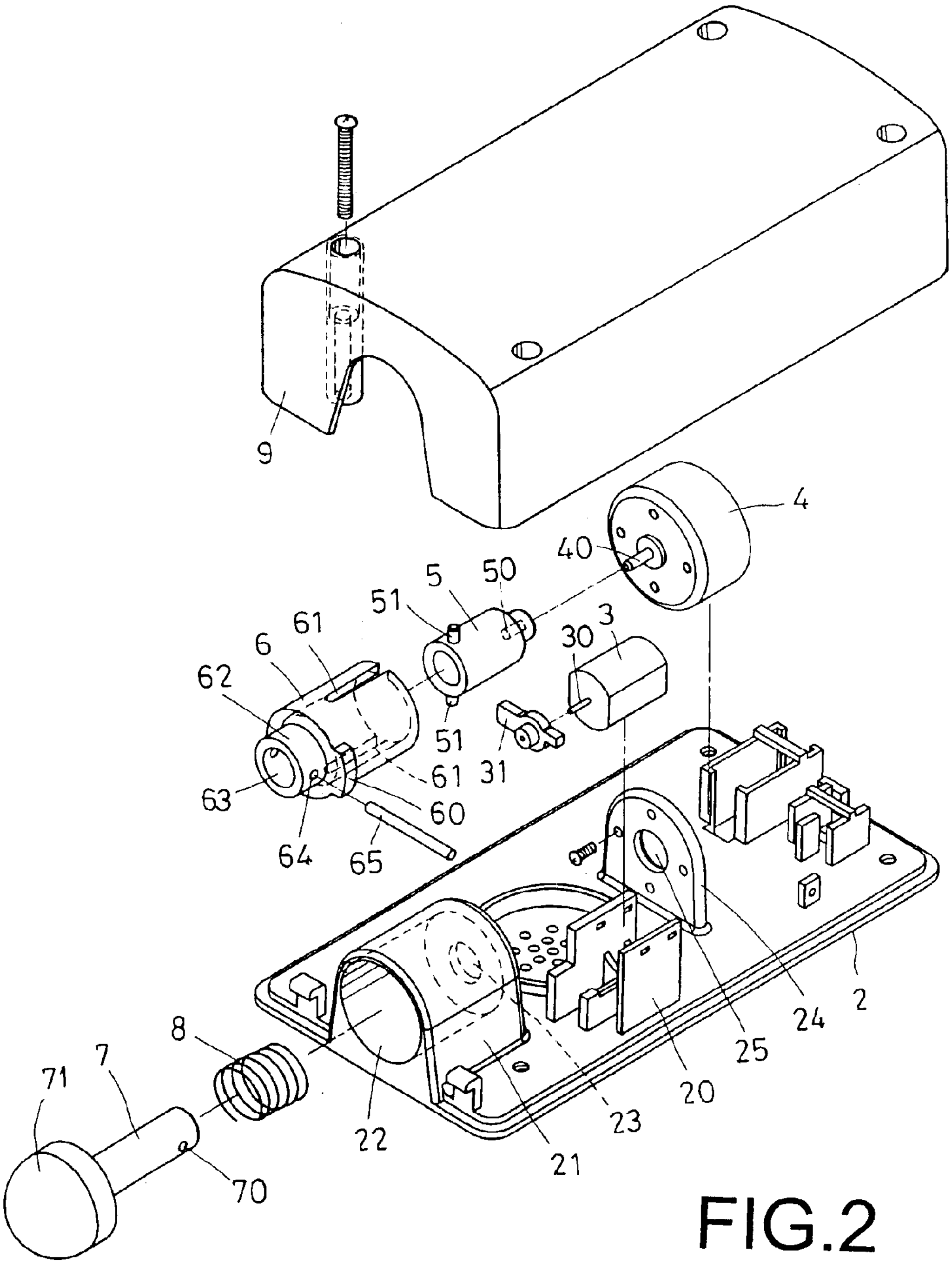
FIG. 2 is an exploded perspective view of a remote-controlled lock in the present invention.

A preferred embodiment of a remote-controlled lock in the present invention, as shown in FIG. 2, includes a bottom base 2, a transmission motor 3, an auxiliary motor 4, a connecting rod 5, a sleeve 6, a deadbolt 7, a spring 8 and a casing 9 combined together.

The bottom base 2 is provided thereon with a motor holder 20, a holding member 21 and a fixing base 24. The holding member 21 is formed with an accommodating hollow 22 having an insert hole 23 in the right side wall, and the fixing base 24 is bored with a shaft hole 25.

The transmission motor 3 is positioned in the motor holder 20 of the bottom base 2, having a stop member 31 secured on its shaft 30.

The auxiliary motor 4 is disposed at the right side of the fixing base 24 of the bottom base 2, having its shaft 40 inserted through the shaft hole 25 of the fixing base 24.

The connecting rod 5 to be fixedly assembled on the shaft 40 of the auxiliary motor 4 has a shaft hole 50 bored at one end and two opposite projecting studs 51 fixed on an outer wall.

The sleeve 6 to be fitted around the connecting rod 5 is provided with a stopper 60 protruding on the wall near the left end, and has two opposite lengthwise slide slots 61 bored in the wall and an annular projection 62 protruding outward at the left end. The projection 62 has a center insert hole 63 and two opposite pin holes 64 bored in the wall and communicating with the insert hole 63 for a pin 65 to be inserted therein.

The deadbolt 7 is connected with the annular projection 62 of the sleeve 6 and inserted in the accommodating hollow 22 of the holding member 21 of the bottom base 2. The deadbolt 7 has two opposite pin holes 70 near the right end and formed with an engage member 71 at the left end formed with semispherical surface.

The spring 8 is fitted around the deadbolt 7, and the casing 9 is assembled on the bottom base 2.

Figure 3:
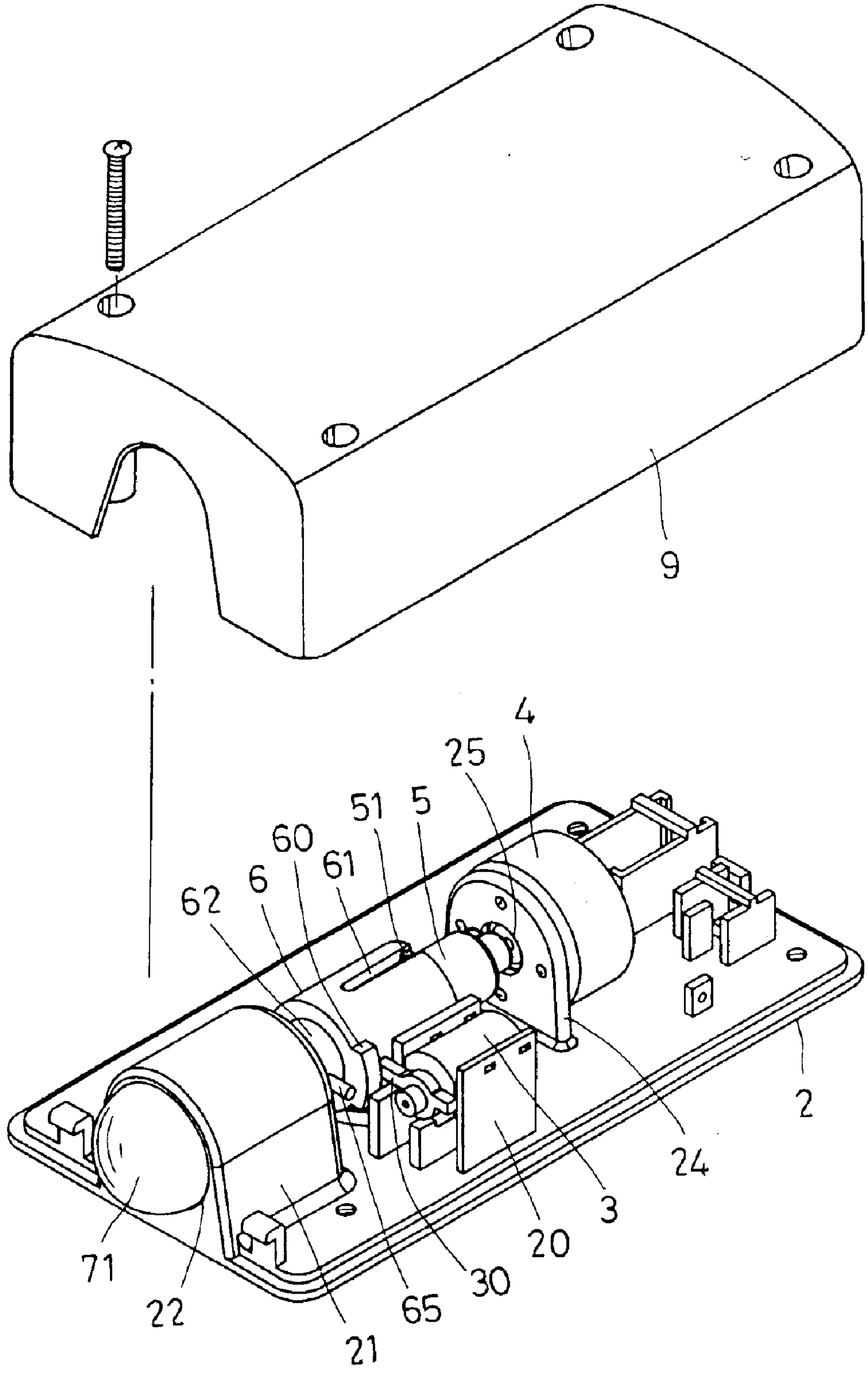
FIG. 3 is a perspective view of the remote-controlled lock in the present invention.
Figure 4:
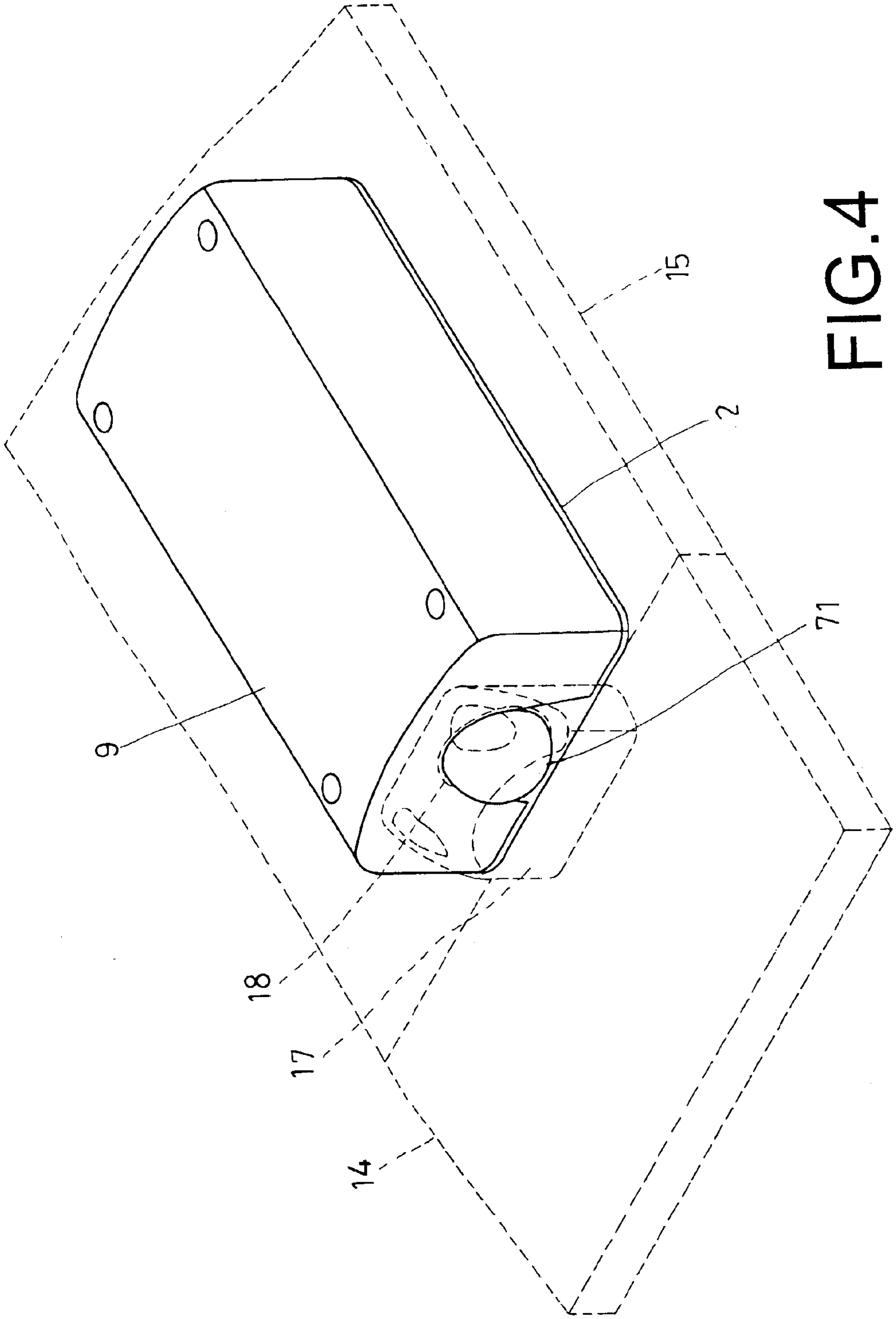
FIG. 4 is a perspective view of the remote-controlled lock assembled on the panel of a door for use in the present invention.

In assembling, as shown in FIGS. 2, 3 and 4, firstly, the stop member 31 is secured on the shaft 30 of the transmission motor 3, which is positioned on the motor holder 20 of the bottom base 2. Then, the auxiliary motor 4 is disposed at the right side of the fixing base 24 of the bottom base 2, having its shaft 40 inserted through the shaft hole 25 of the fixing base 24. Subsequently, the connecting rod 5 is mounted on the shaft 40 of the auxiliary motor 4, and the sleeve 6 is fitted around the connecting rod 5 with its opposite projecting studs 51 respectively located in the two slide slots 61 of the sleeve 6 to enable the sleeve 6 to slide on the connecting rod 5, with the stopper 60 of the sleeve 6 located in front of the stop member 31 of the transmission motor 3.

Next, the spring 8 is fitted around the deadbolt 7 and then the deadbolt 7 together with the spring 8 is positioned in the accommodating hollow 22 of the holding member 21 of the bottom base 2 and has its right end extending out of the insert hole 23 of the accommodating hollow 22 and inserted in the insert hole 63 of the annular projection 62 of the sleeve 6, letting the pin holes 70 of the deadbolt 7 aligned to the pin holes 64 of the sleeve 6. Lastly, a pin 65 is inserted in the pin holes 64 and 70 to let the deadbolt 7 and the sleeve 6 connected together, with the spring 8 having one end pushing against the inner side of the engage member 71 of the deadbolt 7 and the other end pushing against the inner wall of the accommodating hollow 22, and then the casing 9 is assembled on the bottom base 2, thus finishing the assembly of the remote-controlled lock.

Figure 5:
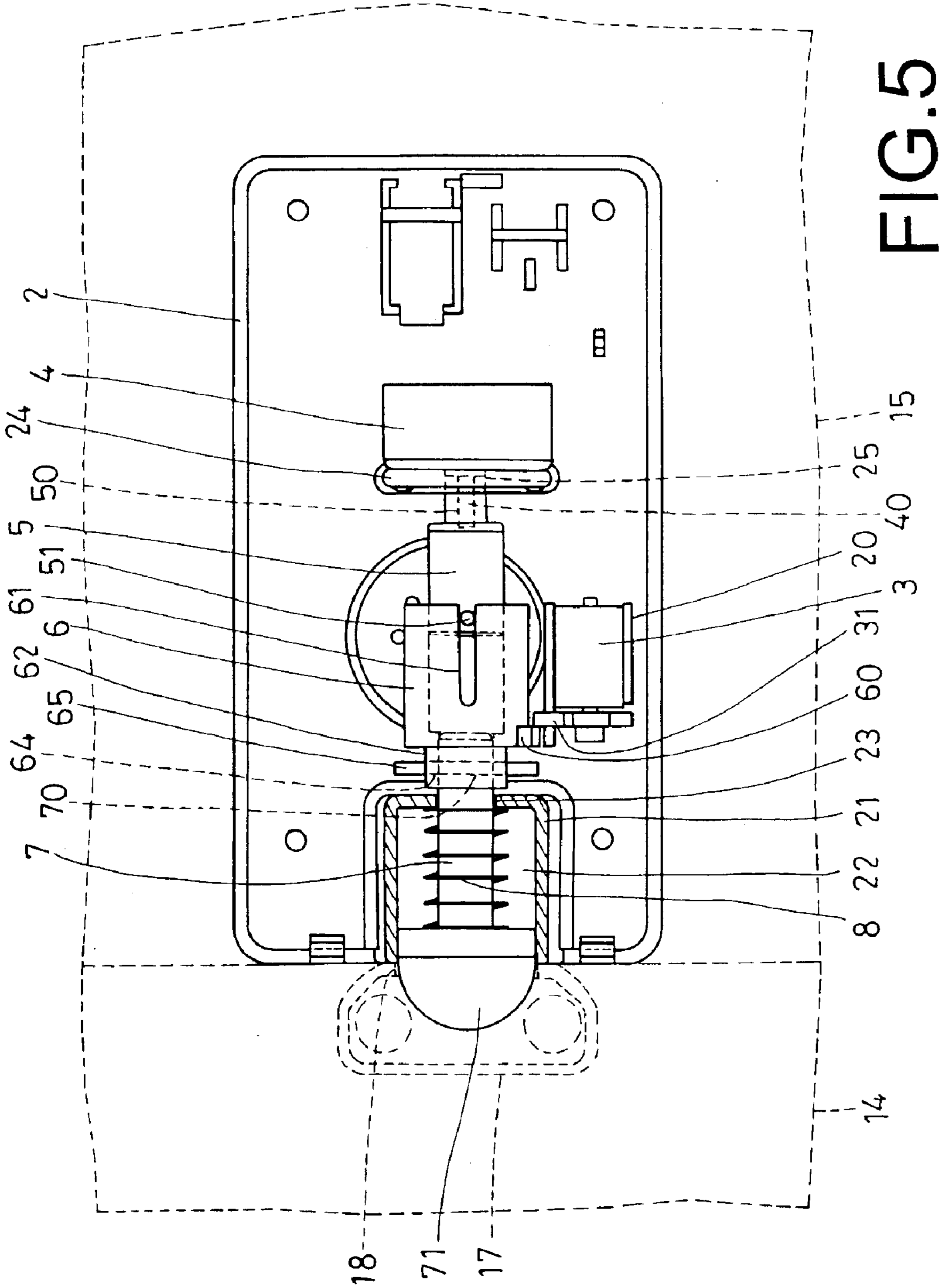
FIG. 5 is a cross-sectional view of the remote-controlled lock in a locked condition in the present invention.
Figure 6:
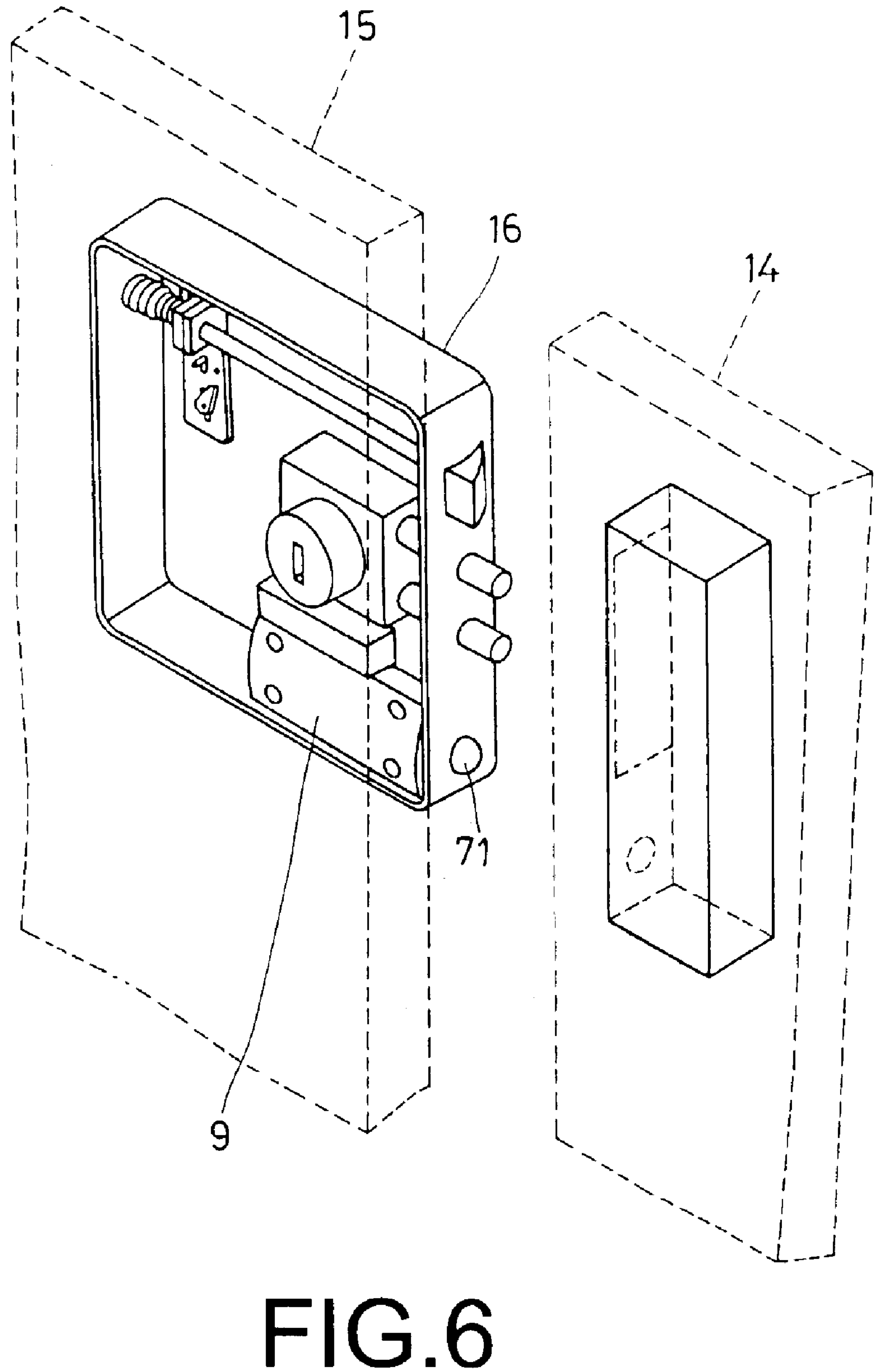
FIG. 6 is a perspective view of the remote-controlled lock assembled within a door lock for use in the present invention; and, FIG. 7 is a cross-sectional view of the remote-controlled lock in an unlocked condition in the present invention.

In using, as shown in FIGS. 4–7, the remote-controlled lock in the invention can be independently installed on the panel of a door, as shown in FIG. 4, or can be additionally installed within any door lock to be locked by both a remote controller and a key, having double functions of anti-theft, as shown in FIG. 6. To lock the remote-controlled lock, as shown in FIG. 5, only press the locking button of a remote controller to start the transmission motor 3 to rotate counterclockwise together with the stop member 31 on its shaft 30. When the stop member 31 rotates and stops behind the stopper 60 of sleeve 6, it will block the stopper 60 and make the sleeve 6 and the deadbolt 7 immovable and unable to be moved inward, letting the engage member 71 of the deadbolt 7 engaged in the engage groove 18 of the engage base 17 of a doorjamb 14 to finish locking of the remote-controlled lock. Thus, the door 15 is impossible to be unlocked before the deadbolt 7 is released by a remote controller.

Figure 7:
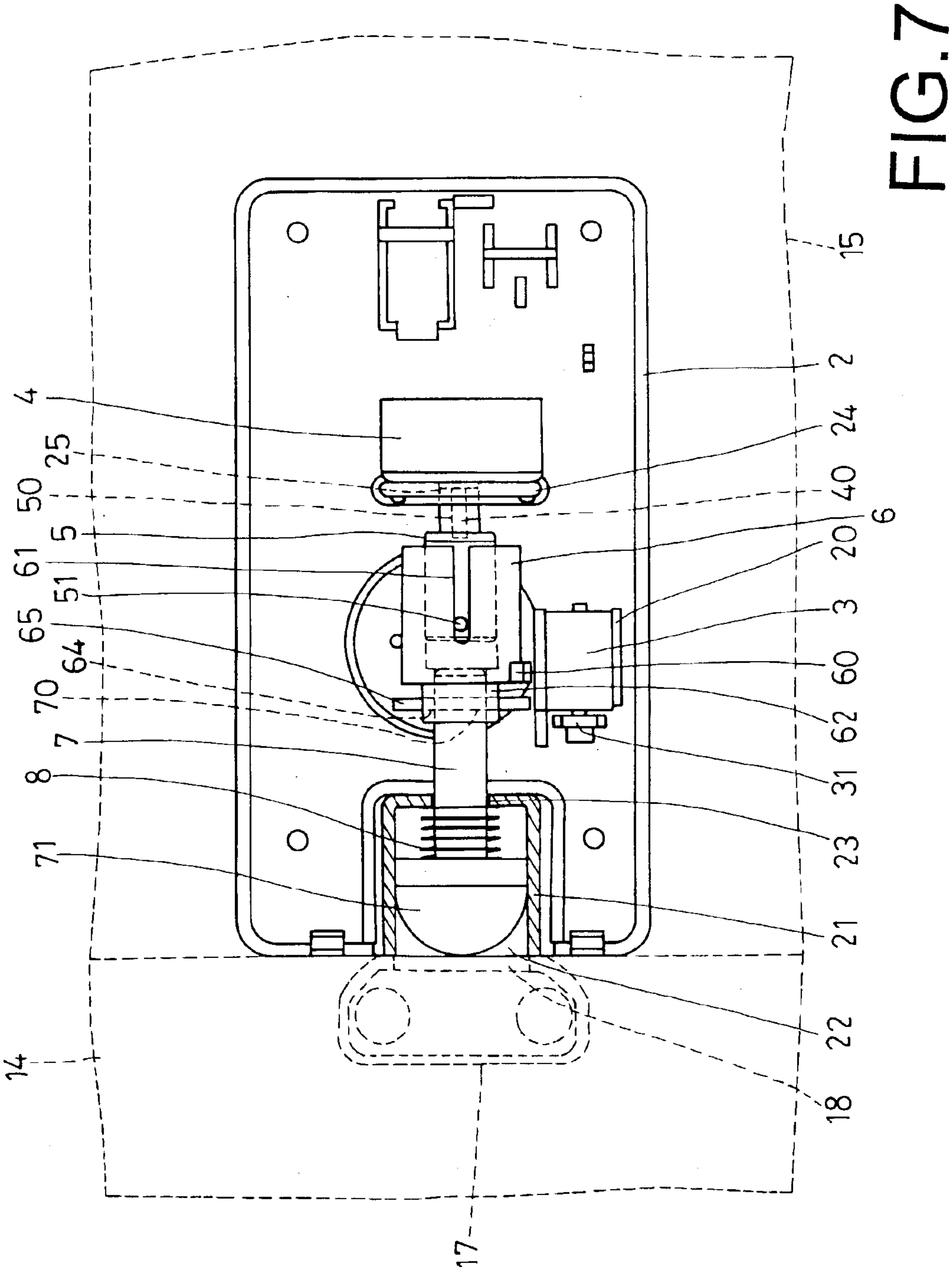

To unlock the remote-controlled lock, simply press the unlocking button of the remote controller to start the transmission motor 3 to rotate clockwise together with the stop member 31 on its shaft 30 to let the stop member 31 disengaged from the rear end of the stopper 60 of the sleeve 6, letting the sleeve 6 no longer blocked by the stop member 31. At this time, the door 15 can be opened and the semispherical engage member 71 at the end of the deadbolt 7 is pushed by the engage base 17 of the doorjamb 14 and moved inward together with the deadbolt 7 and the sleeve 6, which slides on the connecting rod 5, thus finishing unlocking of the remote-controlled lock, as shown in FIG. 7.

When the deadbolt 7 on the panel of a door 15 is disengaged from the engage base 17 of a doorjamb 14, the spring 8 fitted around the deadbolt 7 will recover its resilience and push the deadbolt 7 together with the sleeve 6 to move outward to their original positions. To lock the remote-controlled lock again, just do what is described above to start the transmission motor 3 to rotate counterclockwise together with the stop member 31 to let the stop member 31 block the stopper 60 of the sleeve 6 from behind to finish locking.

After the remote-controlled lock is locked and if the transmission motor 3 is out of order, simply press the auxiliary button of the remote controller to start the auxiliary motor 4 to rotate counterclockwise together with the connecting rod 5 and the sleeve 6 to let the stopper 60 of the sleeve 6 disengaged from the stop member 31 of the transmission motor 3. At this time, the remote-controlled lock is in a released condition and the sleeve 6 together with the deadbolt 7 can be moved inward to finish unlocking of the remote-controlled lock.

As can be understood from the above description, this invention has the following advantages.

1. Locking and unlocking of the remote-controlled lock can only be carried out by a remote controller staring the transmission motor of the lock, having excellent effect of anti-theft.

2. When the transmission motor is out of order, the auxiliary motor can instead be started by the remote controller to carry out unlocking of the remote-controlled lock, ensuring safety in use.

While the preferred embodiment of the invention has been described above, it will be recognized and understood that various modifications may be made therein and the appended claims are intended to cover all such modifications that may fall within the spirit and scope of the invention.

What is claimed is:

1. A remote-controlled lock comprising:

a bottom base provided thereon with a motor base, a holding member and a fixing base, said holding member formed inside with an accommodating hollow provided with an insert hole in its side wall;

a transmission motor positioned on said motor base, said transmission motor having a stop member secured on its shaft;

a connecting rod positioned at one side of said fixing base of said bottom base, said connecting rod provided with two opposite projecting studs on its wall;

a sleeve fitted around said connecting rod, said sleeve provided with a stopper protruding out on the its wall at a front end, said sleeve having its wall bored with two opposite lengthwise slide slots in a rear portion, said sleeve having said front end formed with a an annular projection, said annular projection bored with a center insert hole, said projection provided with two opposite pin holes in the wall, said two pin holes communicating with said center insert hole, a pin inserted in said two pin holes;

a deadbolt connected with said annular projection of said sleeve, said deadbolt positioned in said accommodating hollow of said holding member of said bottom base, said deadbolt bored with two opposite pin holes in the wall, said deadbolt further formed with a semispherical engage member on the outer end;

a spring fitted around said deadbolt;

a casing assembled on said bottom base; and, pressing the unlocking button of a remote controller to start said transmission motor to rotate clockwise together with said stop member, said stop member disengaged from said stopper of said sleeve, said sleeve and said deadbolt able to be moved inward to compress said spring, thus finishing unlocking of said remote-controller lock, on the contrary pressing the locking button of said remote controller to start said transmission motor to rotate counterclockwise together with said stop member, said stop member blocking said stopper of said sleeve, said sleeve restricted in position and unable to be moved inward, said engage member of said deadbolt engaged in the engage groove of the engage base of a doorjamb, thus finishing locking of said remote-controlled lock, said remote-controlled lock controlled by a remote controller to be locked and unlocked, having excellent effect of anti-theft.

2. The remote-controlled lock as claimed in claim 1, wherein said fixing base is provided with a shaft hole, and an auxiliary motor is positioned at one side of said fixing base, said auxiliary motor has its shaft inserted through said shaft hole of said fixing base, said connecting rod is secured on said shaft of said auxiliary motor, when said transmission motor is out of order, press the auxiliary button of said remote controller to start said auxiliary motor to rotate together with said connecting rod and said sleeve to let the stopper of said sleeve disengaged from said stop member of said transmission motor when said transmission motor is out of order, said sleeve and said deadbolt possible to be moved inward to finish unlocking of said remote-controlled lock.

* * * * *